Patented Mar. 20, 1928.

1,663,125

UNITED STATES PATENT OFFICE.

PALMER W. GRIFFITH, OF ELIZABETH, NEW JERSEY, ASSIGNOR TO AMERICAN CYANAMID COMPANY, OF NEW YORK, N. Y., A CORPORATION OF MAINE.

METHOD OF TREATING CALCIUM CYANIDE.

No Drawing.   Application filed February 24, 1926.   Serial No. 90,425.

This invention relates to the manufacture of cyanides, more particularly to the production of a cyanide having relatively high cyanogen content from a cyanide having a lower cyanogen content.

It is among the objects of this invention to devise a method of increasing the cyanogen content of an impure calcium cyanide which shall be simple and inexpensive and which may be operated by unskilled workmen with a minimum of training.

In recent years there has been placed on the market a material which is considered to be calcium cyanide mixed with a considerable proportion of impurities. This composition is made by fusing a mixture of calcium cyanamid and common salt in an electric furnace whereby the cyanamid is practically quantitatively converted into cyanide by reaction with an excess of carbon present in the cyanamid, the salt serving the purpose of a flux and facilitating the reaction. The molten material is then rapidly cooled to prevent any substantial decomposition of the cyanide formed at the high temperatures. A typical approximate analysis of this material is given below.

|  | Per cent. |
|---|---|
| $Ca(CN)_2$ | 46 |
| NaCl | 32 |
| CaO | 14 |
| Graphite | 3 |
| $CaC_2$ | 1 |
| Misc. | 4 |

The miscellaneous ingredients include a small amount of unconverted calcium cyanamid, silica, iron oxide, alumina, magnesia and sulphur.

This material is used very extensively in the mining industry as a means for dissolving the precious metals from ores containing the same, as a fumigant for the destruction of insect and animal pests and in other industries such as for case hardening, electroplating and the like. For all these uses only the cyanogen content of the material is useful, the remainder being inert diluents which take no active part in the reactions and serve no really useful purpose. Generally the calcium cyanide constitutes from 45% to 50% of the mixture and it is naturally desirable to increase this content. This may be done during manufacture of the material but such a procedure is rather expensive and the present invention is designed to increase the cyanogen content of the mixture in a very simple manner.

In practicing my invention I cause the impure calcium cyanide to react with liquid hydrocyanic acid, the result being that the cyanide takes up in one form or another a relatively large amount of hydrocyanic acid which becomes permanently united therewith. More specifically, I provide a mixture of the impure calcium cyanide with an excess of liquid hydrocyanic acid over that necessary to completely react with the crude material and agitate the same for a considerable period of time to cause the reaction to take place, and then I distill off the excess of hydrocyanic acid, preferably at a low temperature with the aid of a vacuum.

I have conducted a number of experiments which show conclusively that the impure calcium cyanide is capable of absorbing and retaining, probably in chemical combination, a considerable percentage of hydrocyanic acid. For example, I took 200 kilograms of an impure calcium cyanide containing 46.25% of the cyanide and placed the same in a suitable reaction vessel. Commercial liquid hydrocyanic acid containing 2% to 3% of water was treated with calcium chloride for about twelve hours to remove the water therefrom and 160 liters thereof was added to the reaction vessel, forming a rather thick slurry. The mixture was agitated for about fifteen minutes, the excess of hydrocyanic acid was removed by heating the reaction vessel at 35° C. by means of a water jacket, and the last traces of free hydrocyanic acid were removed by means of a vacuum at room temperature. The resulting product contained 52.25% of calcium cyanide, an increase of 6% over that initially present in the material.

In another experiment 200 kilograms of impure calcium cyanide were mixed with 25 liters of water-free liquid hydrocyanic acid in the reaction vessel and agitated for about one hour and allowed to stand overnight. The excess hydrocyanic acid was removed from the material by a vacuum at room temperature. Analysis showed that the resulting material contained 52.35% calcium cyanide. In another experiment the same amount of impure calcium cyanide was agitated with 15 liters of hydrocyanic acid for one hour after which the excess of hydrocyanic acid was distilled off. An additional 15 liters of hydrocyanic acid were then added and the reaction mixture agitated for one hour. Another 10 liters of hydrocyanic acid were added, the whole agitated for another hour and the mixture allowed to remain in the vessel for about ten hours. The excess of hydrocyanic acid was removed with a vacuum at room temperature and the resulting material showed a calcium cyanide content of 52.40 per cent.

It will be noted that by a very simple procedure involving no complicated apparatus, but merely a reaction vessel and means for removing excess hydrocyanic acid, I have been enabled to add over 6% of calcium cyanide to the mixture. As far as I am aware, the above amount of calcium cyanide in a mixture of this kind has never before been attained by the addition of hydrocyanic acid to an impure cyanide. The product resulting from this treatment is more active than before the operation in that it gives up its cyanogen content more rapidly and more completely when used as a fumigant. In my description of the invention I have given a number of details of procedure which I preferably use in carrying out my process but it is to be understood that the invention is not to be limited to the details set forth as various changes may be made therein within the scope of this invention.

What I claim is:

1. A method of increasing the cyanogen content of impure calcium cyanide which comprises agitating the same with an excess of liquid hydrocyanic acid and distilling off the unreacted hydrocyanic acid.

2. A method of increasing the cyanogen content of impure calcium cyanide which comprises agitating the same with an excess of liquid hydrocyanic acid in the absence of any substantial amount of water and distilling off the unreacted hydrocyanic acid.

3. A method of increasing the cyanogen content of impure calcium cyanide which comprises removing water from liquid hydrocyanic acid, making a slurry of said calcium cyanide with said hydrocyanic acid, agitating said slurry for a considerable length of time, and then distilling off any unreacted liquid hydrocyanic acid.

4. A method of increasing the cyanogen content of impure calcium cyanide which comprises removing water from liquid hydrocyanic acid, making a slurry of said calcium cyanide with said hydrocyanic acid in the proportion of 200 parts of calcium cyanide to at least 25 parts of liquid hydrocyanic acid, agitating said slurry for a considerable length of time, and distilling off any unreacted liquid hydrocyanic acid.

In testimony whereof, I have hereunto subscribed my name this 20th day of February, 1926.

PALMER W. GRIFFITH.